(12) United States Patent
Krijn et al.

(10) Patent No.: US 7,839,378 B2
(45) Date of Patent: Nov. 23, 2010

(54) DETECTION OF VIEW MODE

(75) Inventors: Marcellinus Petrus Carolus Michael Krijn, Eindhoven (NL); Wilbert Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 950 days.

(21) Appl. No.: 11/573,571

(22) PCT Filed: Aug. 4, 2005

(86) PCT No.: PCT/IB2005/052607
§ 371 (c)(1),
(2), (4) Date: Feb. 12, 2007

(87) PCT Pub. No.: WO2006/018773
PCT Pub. Date: Feb. 23, 2006

(65) Prior Publication Data
US 2007/0222855 A1  Sep. 27, 2007

(30) Foreign Application Priority Data
Aug. 17, 2004 (EP) .................................. 04103937

(51) Int. Cl.
G09G 3/36 (2006.01)
(52) U.S. Cl. .................... 345/102; 345/419; 345/697; 348/42; 348/46; 348/51; 348/59; 359/462; 359/475
(58) Field of Classification Search .............. 345/32, 345/102, 204, 215, 419, 428, 606, 690, 694, 345/697; 348/42, 46, 51, 56, 59; 359/462, 359/464, 467, 475
See application file for complete search history.

(56) References Cited

U.S. PATENT DOCUMENTS

| 5,315,377 | A | * | 5/1994 | Isono et al. .................. 348/51 |
| 5,986,804 | A |   | 11/1999 | Mashitani et al. |
| 6,064,424 | A |   | 5/2000 | van Berkel et al. |

(Continued)

FOREIGN PATENT DOCUMENTS

EP  0751690  A2  1/1997

(Continued)

OTHER PUBLICATIONS

Jesse Eichenlaub; "A Lightweight, Compact 2D/3D Autostereoscopic LCD Backlight for Games, Monitor, and Notebook Applications", Dimension Tech., Rochester, NY, SPIE. vol. 3295, pp. 180-186, Jan. 1998.

(Continued)

Primary Examiner—Henry N Tran

(57) ABSTRACT

A unit for an method of analyzing received image data to determine whether the received image data corresponds to a single-view or to multiple views is disclosed. The method comprises: dividing the received image data (200) into a number of structures (1-9) of data elements (224-234); computing a correlation between a first one (1) of the structures of data elements and a second one (2) of the structures of data elements; and establishing that the received image-data corresponds to multiple views on basis of the correlation between the first one of the structures of data elements and the second one of the structures of data elements.

11 Claims, 6 Drawing Sheets

U.S. PATENT DOCUMENTS

| | | | |
|---|---|---|---|
| 6,069,650 A * | 5/2000 | Battersby | 348/59 |
| 7,058,252 B2 | 6/2006 | Woodgate et al. | |
| 7,619,604 B2 * | 11/2009 | Karman et al. | 345/102 |
| 7,643,552 B2 * | 1/2010 | Saishu et al. | 375/240.01 |

FOREIGN PATENT DOCUMENTS

| | | |
|---|---|---|
| EP | 1024672 A1 | 8/2000 |
| EP | 041010240 | 3/2004 |
| EP | 1499119 A1 | 1/2005 |
| EP | 1501317EP A1 | 1/2005 |
| JP | 08331599 A | 12/1996 |
| WO | 03015424 A2 | 2/2003 |
| WO | 03053071 A1 | 6/2003 |

OTHER PUBLICATIONS

Alan Sullivan; "58.3: A Solid-State Multi-planner Volumetric Display", VIZTA3D, Inc., Norwalk, CT, SID 03 Digest, pp. 1531-1533, 2003.

D.F. McAllister; "Stereo Computer Graphics and Other True 3-D Technologies", Princeton, Univ. Press, 1993. Book.

* cited by examiner

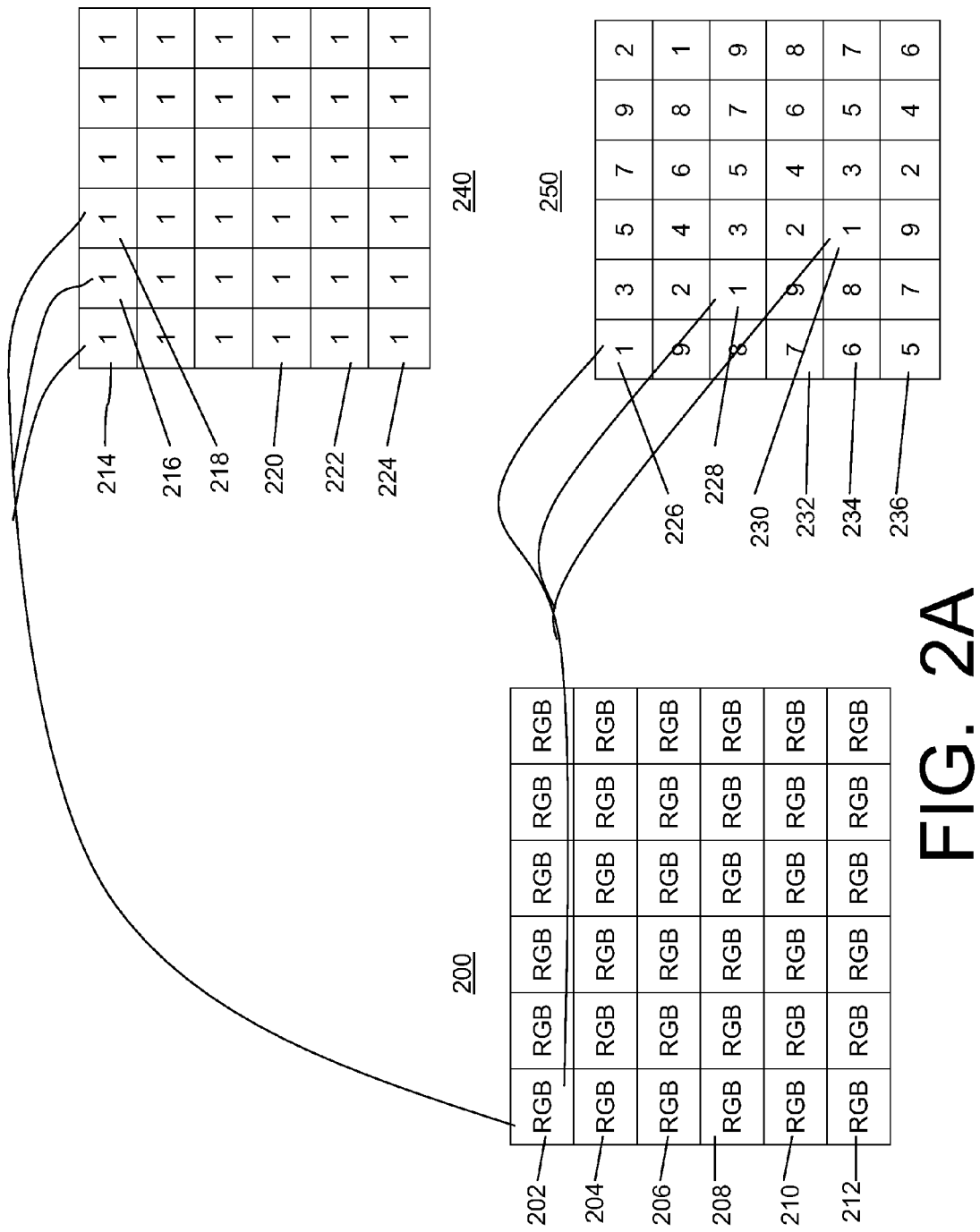

DETECTION OF VIEW MODE

The invention relates to a method of analyzing received image data to determine whether the received image data corresponds to a single-view or to multiple views.

The invention further relates to a computer program product to be loaded by a computer arrangement, comprising instructions to analyze received image data in order to determine whether the received image data corresponds to a single-view or to multiple views.

The invention further relates to a view mode analyzing unit for analyzing received image data to determine whether the received image data corresponds to a single-view or to multiple views.

The invention further relates to a display device which is arranged to display multiple views on basis of received image data, the display device comprising a view mode analyzing unit as mentioned above.

Since the introduction of display devices, a realistic 3-D display device has been a dream for many. Many principles that should lead to such a display device have been investigated. Some principles try to create a realistic 3-D object in a certain volume. For instance, in the display device as disclosed in the article "Solid-state Multi-planar Volumetric Display", by A. Sullivan in proceedings of SID'03, 1531-1533, 2003, information is displaced at an array of planes by means of a fast projector. Each plane is a switchable diffuser. If the number of planes is sufficiently high the human brain integrates the picture and observes a realistic 3-D object. This principles allows a viewer to look around the object within some extend. In this display device all objects are (semi-) transparent.

Many others try to create a 3-D display device based on binocular disparity only. In these systems the left and right eye of the viewer perceives another image and consequently, the viewer perceives a 3-D image. An overview off these concepts can be found in the book "Stereo Computer Graphics and Other True 3-D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3-D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different images in his left and right eye if he is positioned at the correct spot, and is able to perceive a 3-D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See, for instance, U.S. Pat. No. 5,986,804, where a barrier plate is combined with a red and green led. when the viewer is well positioned, he sees a green light, otherwise he sees a red light.

To relieve the viewer of sitting at a fixed position, multi-view auto-stereoscopic display devices have been proposed. In the display device as disclosed in U.S. Pat. No. 6,04,424, a slanted lenticular is used, whereby the width of the lenticular is larger than two sub-pixels. In this way, there are several images next to each other and the viewer has some freedom to move to the left and right.

A drawback of auto-stereoscopic display devices is the resolution loss incorporated with the generation of 3-D images. It is advantageous that those display devices are switchable between a 2-D and 3-D mode, i.e. a single-view mode and a multi-view mode. If a relatively high resolution is required, it is possible to switch to the single-view mode since that has higher resolution.

An example of such a switchable display device is described in the article "A lightweight compact 2-D/3-D autostereoscopic LCD backlight for games, monitor and notebook applications" by J. Eichenlaub in proceedings of SPIE 3295, 1998. It is disclosed that a switchable diffuser is used to switch between a 2-D and 3-D mode. Another example of a switchable auto-stereoscopic display device is described in International Patent Application Publication No. WO2003015424, corresponding to U.S. Pat. No. 7,058,252, where LC based lenses are used to create a switchable lenticular.

In principle it is possible to switch the entire display device from 2-D to 3-D and vice versa. Alternatively, only a portion of the display device is switched. In order to switch between the view modes, appropriate control information is required as input.

It will be clear that a display device which is arranged to receive image data which may correspond to a single-view or to multiple views must be arranged to determine whether the received image data is compatible with the capabilities of the display device. The display device may be arranged to switch to a particular view mode, e.g. single-view or multiple view on basis of the actual number of views in the received image data. Alternatively, the display device may be arranged to map the received image data corresponding to e.g. 9 views into display data corresponding to 8 views. This may e.g. be done by disregarding a portion of the received image data corresponding to one of the 9 views. It will be clear that there is the needs to establish the actual number of views in the received image data.

It is an object of the invention to provide a method of the kind described in the opening paragraph to determine whether the received image data corresponds to a single-view or to multiple views, in a relatively easy way.

This object of the invention is achieved in that the method comprises:
- dividing the received image data into a number of structures of data elements;
- computing a correlation between a first one of the structures of data elements and a second one of the structures of data elements; and
- establishing that the received image data corresponds to multiple views on basis of the correlation between the first one of the structures of data elements and the second one of the structures of data elements.

The invention is based on the fact that the different views which together form a multi-view image are relatively strong correlated. Typically, the different views correspond to the same scene being captured by one or more cameras from slightly different angles. That means that the views show mutually strong resemblance. Comparing corresponding luminance and/or color values of pixels, i.e. data elements of the different views results in a measure which represents the amount of correlation. The received image data comprises a regular structure of data elements. E.g. a two-dimensional matrix of luminance values or RGB triplets. A priori it is not known whether the data elements belong to a single-view or whether they belong to multiple views having a lower spatial resolution than the single-view. To analyze the received image data it is assumed that the received image data corresponds to multiple views. Preferably, an assumption is made about the actual number of views and the layout of structures of data elements. The received image data is split into a number of structures of data elements on basis of that assumption. E.g. if the assumption is that there are two views, then the even data elements of the received image data are allocated to a first one of the structures of data elements and the odd data elements of the received image data are allocated to a second one of the structures of data elements. Finally, the assumption is verified by means of computing a correlation and analyzing the correlation. Preferably the analyzing comprises comparing the correlation with a predetermined threshold.

An embodiment of the method according to the invention, further comprises computing a further correlation between the first one of the structures of data elements and a third one of the structures of data elements and establishing that the received image data corresponds to multiple views if the further correlation is lower than the correlation between the first one of the structures of data elements and the second one of the structures of data elements. As said, there is a correlation between different views of a multi-view image. Typically, the correlations between the different views are not mutually equal. For instance two subsequent views are in general more correlated than to views which are located further away from each other. Comparing computed correlations besides comparing a correlation with a predetermined threshold results in a higher robustness.

An embodiment of the method according to the invention, further comprises computing a sequence of further correlations between the first of the structures of data elements and respective further structures of data elements and establishing that the received image data corresponds to multiple views if the consecutive correlations of the sequence of further correlations are mutually related according to a predetermined pattern. Besides comparing correlations of two pairs of structures of data elements it is advantageous to compare multiple correlations with each other. This results in a more robust method. A predetermined pattern may for instance be a sequence of values of which consecutive values are lower than the previous values. Alternatively the consecutive values are higher. It will be clear that other patterns are possible, e.g. a periodic pattern like 10,9,8,7,8,9,10.

In an embodiment of the method according to the invention, dividing the received image data into the number of structures of data elements is based on selecting a particular layout of structures of data elements from a set of layouts of structures of data elements. Dividing the received image data into a number of structures of data elements is based on an assumed layout. That means a spatial arrangement of data elements of different structures relative to further data elements of further structures. The actual layout is not known. In principle there are several layouts possible, i.e. there is a set of layouts of structures of data elements. For instance a first layout which is suitable for a display device with two views, a second layout which is suitable for a display device with eight views, a third layout which is suitable for a display device with the nine views, et cetera. This embodiment of the method according to the invention is arranged to evaluate a number of layouts. A first layout is selected from the set of layouts and evaluated by computing the various correlations and mutually comparing the correlations. Subsequently a second layout is selected and evaluated in a similar way. Optionally, further layouts are evaluated. Finally the best matching layout is selected on basis of the various evaluations.

Typically, the particular layout of structures of data elements corresponds to a particular layout of structure of light generating elements of a display device which is arranged to receive the image data and which is arranged to generate a particular number of views which matches with the particular layout of structures of data elements.

It is a further object of the invention to provide a computer program product of the kind described in the opening paragraph to determine whether the received image data corresponds to a single-view or to multiple views in a relatively easy way.

This object of the invention is achieved in that the computer program product comprises processing means and a memory, the computer program product, after being loaded, providing said processing means with the capability to carry out:
  dividing the received image data into a number of structures of data elements;
  computing a correlation between a first one of the structures of data elements and a second one of the structures of data elements; and
  establishing that the received image data corresponds to multiple views on basis of the correlation between the first one of the structures of data elements and the second one of the structures of data elements.

It is a further object of the invention to provide a view mode analyzing unit of the kind described in the opening paragraph which is arranged to determine whether the received image data corresponds to a single-view or to multiple views in a relatively easy way.

This object of the invention is achieved in that the view mode analyzing unit comprises:
  dividing means for dividing the received image data into a number of structures of data elements;
  computing means for computing a correlation between a first one of the structures of data elements and a second one of the structures of data elements; and
  establishing means for establishing that the received image data corresponds to multiple views on basis of the correlation between the first one of the structures of data elements and the second one of the structures of data elements.

It is a further object of the invention to provide a display device of the kind described in the opening paragraph which is arranged to determine whether the received image data corresponds to a single-view or to multiple views in a relatively easy way.

This object of the invention is achieved in that the view mode analyzing unit of the display device comprises:
  dividing means for dividing the received image data into a number of structures of data elements;
  computing means for computing a correlation between a first one of the structures of data elements and a second one of the structures of data elements; and
  establishing means for establishing that the received image data corresponds to multiple views on basis of the correlation between the first one of the structures of data elements and the second one of the structures of data elements.

An embodiment of the display device according to the invention is arranged to switch a portion of the display device between a first view mode and a second view mode, comprising optical means for transferring the generated light in dependence of an actual view mode of the portion of the display device, the actual view mode being either the first view mode or the second view mode, the optical means being controlled by the view mode analyzing unit. Typically the first view mode corresponds to a single-view mode and the second view mode corresponds to a multi-view mode.

An embodiment of the display device according to the invention comprises mapping means for mapping a first number of views into a second number of views, being different from the first number of views.

Modifications of the view mode analyzing unit and variations thereof may correspond to modifications and variations thereof of the display device, the method and the computer program product, being described.

These and other aspects of the view mode analyzing unit, of the display device, of the method and of the computer program product, according to the invention will become apparent from and will be elucidated with respect to the implementations and embodiments described hereinafter and with reference to the accompanying drawings, wherein:

FIG. 1 schematically shows an embodiment of a switchable display device according to the invention;

FIG. 2A schematically shows two alternative mappings of received image data on a first structure of data elements and a second structure of data elements;

FIG. 2B schematically shows further mappings of received image data on a third structure of data elements and a fourth structure of data elements;

Same reference numerals are used to denote similar parts throughout the figures.

Figure 1:
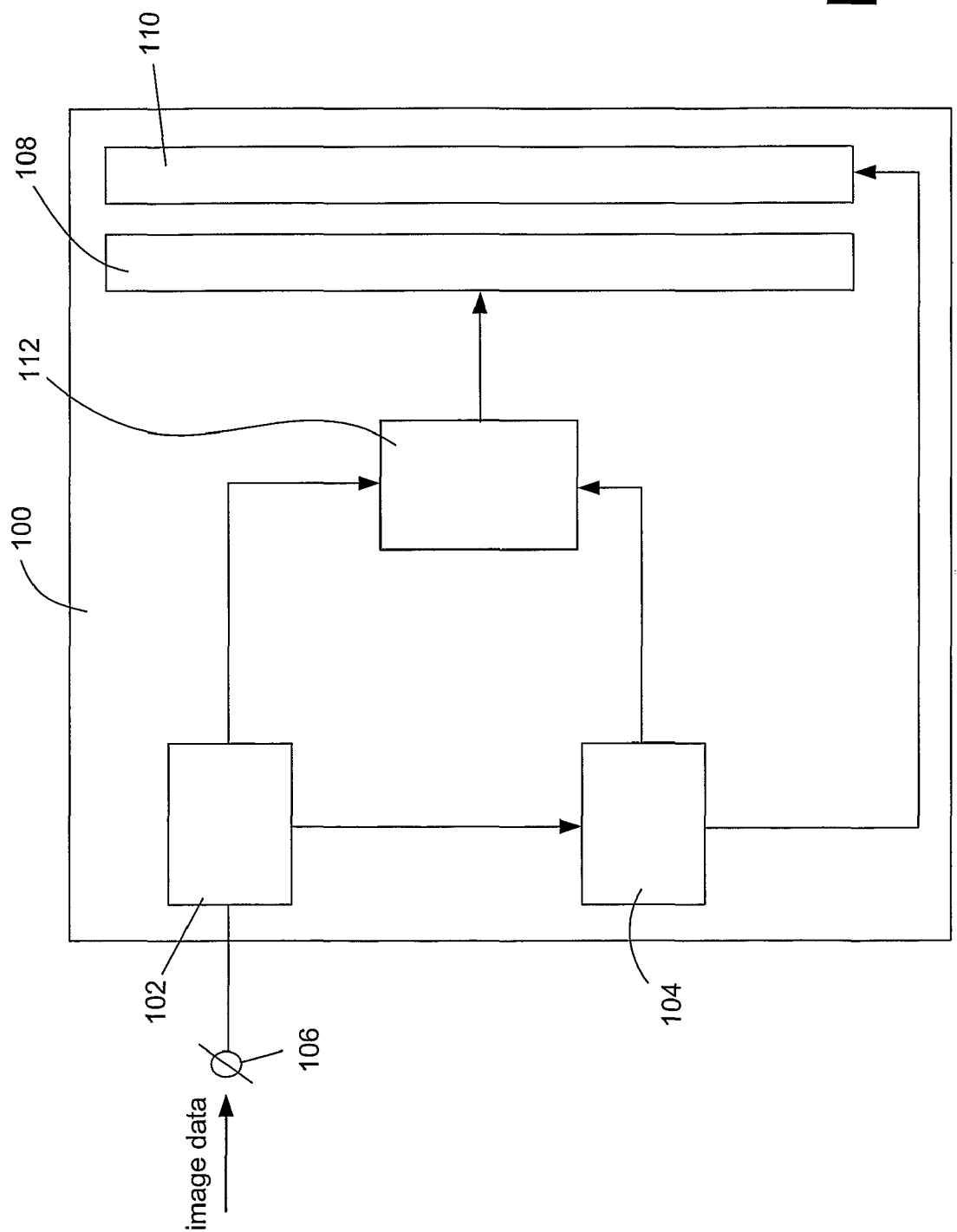

FIG. 1 schematically shows an embodiment of the switchable display device 100 according to the invention. The switchable display device 100 is arranged to switch between view modes. In the single-view mode, also called 2-D view mode only one image is generated. In other words, in the single-view mode a single-view is generated which can be viewed in a viewing cone with a relatively large viewing angle. In the multi-view mode, also called 3-D view mode, multiple images are generated. These images can be viewed in different viewing cones, each having a viewing angle which is substantially smaller than the said viewing cone. For example, the number of views in the multi-view mode is 9. Typically, the viewing cones are such that a viewer which is positioned appropriately relative to the display device 100 is presented with a first view to his left eye and a second view, which is correlated to the first view, to his right eye resulting in a 3-D impression.

The switchable display device 100 is arranged to switch completely or only partially, i.e. the entire display device 100 is in the single-view mode or the multi-view mode, or alternatively a first portion of the display device 100 is in the single-view mode while a second portion is in the multi-view mode. For instance, most of the display device is in single-view mode, while a window is in multi-view mode.

The display device 100 comprises:
- a receiving unit 102 for receiving image data which is provided at the input connector 106;
- a light generating unit 108 for generating light on basis of the receive image data;
- an optical directing unit 110 for transferring the generated light in dependence of an actual view mode of the display device;
- an image rendering unit 112 which is arranged to compute driving values to be provided to the light generating unit 108 on basis of the image data as received by the receiving unit 102; and
- a view mode analyzing unit 104 for analyzing the received image data to determine whether the received image data corresponds to a single-view or to multiple views. The view mode analyzing unit 104 is explained in more detail in connection with FIGS. 2-5. The view mode analyzing unit 104 is arranged to determine whether the received image data partly or completely corresponds to one of the view modes. If a first portion of the received image data corresponds to single-view and a second portion corresponds to multi-view then the view mode analyzing unit 104 provides the optical directing unit 110 with the coordinates of the first and second portion.

The received image has a format comprising elements having respective luminance values. For instance the information signal is a video signal with an RGB format. It should be noted that luminance is represented by means of the RGB components. Alternatively the YUV format or another format is used to provide the display device 100 with input. The image data may be a broadcast signal received via an antenna or cable but may also be a signal from a storage device like a VCR (Video Cassette Recorder) or Digital Versatile Disk (DVD).

The light generating unit 108 comprises a matrix of light generating elements which are modulated on basis of a driving signal which is based on the image data. Preferably the light generating unit 108 comprises on an LCD.

The optical directing unit 110 may be based on controllable parallax barriers. With controllable is meant that the amount of light absorption is not fixed. For instance in a first state the parallax barriers are turned off, meaning that they do not absorb the generated light. In that first state the switchable display device 100 is in the single-view mode. In a second state the parallax barriers are turned on, meaning that they absorb the light in certain directions. In that second state the switchable device 100 is in the multi-view mode. Optionally, the position of the parallax barriers is controllable, enabling directing light in response of eye tracking.

Preferably, the optical directing unit 110 is based on lenses. In order to switch between the single-view mode and the multi view mode the optical directing unit 110 optionally comprises a diffuser. Alternatively, the optical directing unit 110 comprises switchable lenses or comprises means which are arranged to cooperate with the lenses arranged to compensate for the effect of the lenses.

The image rendering unit 112 is arranged to compute driving values to be provided to the light generating unit 108 on basis of the image data as received by the receiving unit 102. The driving values may be directly based on luminance values of the received image data. That means that there is a one-to-one relation between luminance values as received and output values of image rendering unit 112. In that case the image rendering unit is simply passing values. However, there may be a difference in image resolution between the image data as received and the resolution of the image display device. In that case an image scaling is required.

It may also be that the image data as received comprises a different number of views than the display device is arranged to display. In that case a mapping is required. The mapping may be disregarding a portion of the received image data corresponding to one or more views. Alternatively, data corresponding to additional views is generated on basis of the received image data. That generation may be based on simply coping a portion of the received image data. Preferably the data of such an additional view is generated by means of interpolation, i.e. spatial filtering.

The receiving unit 102, the image rendering unit 112 and the view mode analyzing unit 104 may be implemented using one processor. Normally, these functions are performed under control of a software program. During execution, normally the software program is loaded into a memory, like a RAM, and executed from there. The software program may be loaded from a background memory, i.e., a non-transitory computer-readable storage medium like a ROM, hard disk, or magnetically and/or optical storage having the software program encoded thereon, or may be loaded via a network like Internet. Optionally an application specific integrated circuit provides the disclosed functionality.

The switchable display device 100 according to the invention might e.g. be a TV. Optionally the image processing apparatus 100 comprises storage means, like a hard-disk or means for storage on removable media, e.g. optical disks.

To summarize, suppose an embodiment of the multi-view display device according to the invention receives image data is switchable between a single-view mode and a multi-view mode with N views. That display device is arranged to detect how many views are present in the received image data. In the case that it is only one view, the display device switches to the single-view mode. In case the image contains M views and M is not equal to N, the following alternatives are possible:

display a message to alert the viewer that the received image data is incompatible with the 3-D display;

apply the display device in a single-view mode and display only one of the views present in the received image data;

interpolate (or extrapolate) the M views to obtain N views and display these N views in the multi-view mode of the display device. Preferably, the central view in the received image data is determined in order to arrange that this view is directed in a direction substantially perpendicular to the display device. With central view is meant the view of which the average inter-view correlation coefficient is relatively low. (See below for a definition of into two correlation coefficient).

FIG. 2A schematically shows two alternative mappings of received image data 200 on a first structure 240 of data elements and a second structure 250 of data elements. Suppose that the image data as received is structured according to a well-known RGB (red, green, blue) format. That means that a two-dimensional matrix 200 of triplets of values 202-212 is received. The mutual correlation of the triplets is not known, i.e. it is not known whether the received image data corresponds to a single-view or to multiple views. Assuming that the received image data corresponds to a single-view, then a mapping of RGB values to driving values 214-224, by means of the image rendering unit 112, as indicated in the upper part 240 of FIG. 2A is appropriate. The upper part 240 of FIG. 2A shows a layout of data elements which all correspond to the same view, i.e., view number 1. For instance, the three components of a first 202 of the triplets of values is mapped to three different driving values 214-218 corresponding to three different light generating elements of the light generating unit 108.

However, assuming that the received image data corresponds to 9 views, then a mapping of RGB values to driving values 226-236 as indicated in the lower part 250 of FIG. 2A is appropriate. The lower part 250 of FIG. 2A shows a layout of data elements which correspond to nine different views, indicated with the numbers 1-9.

Figure 2B:
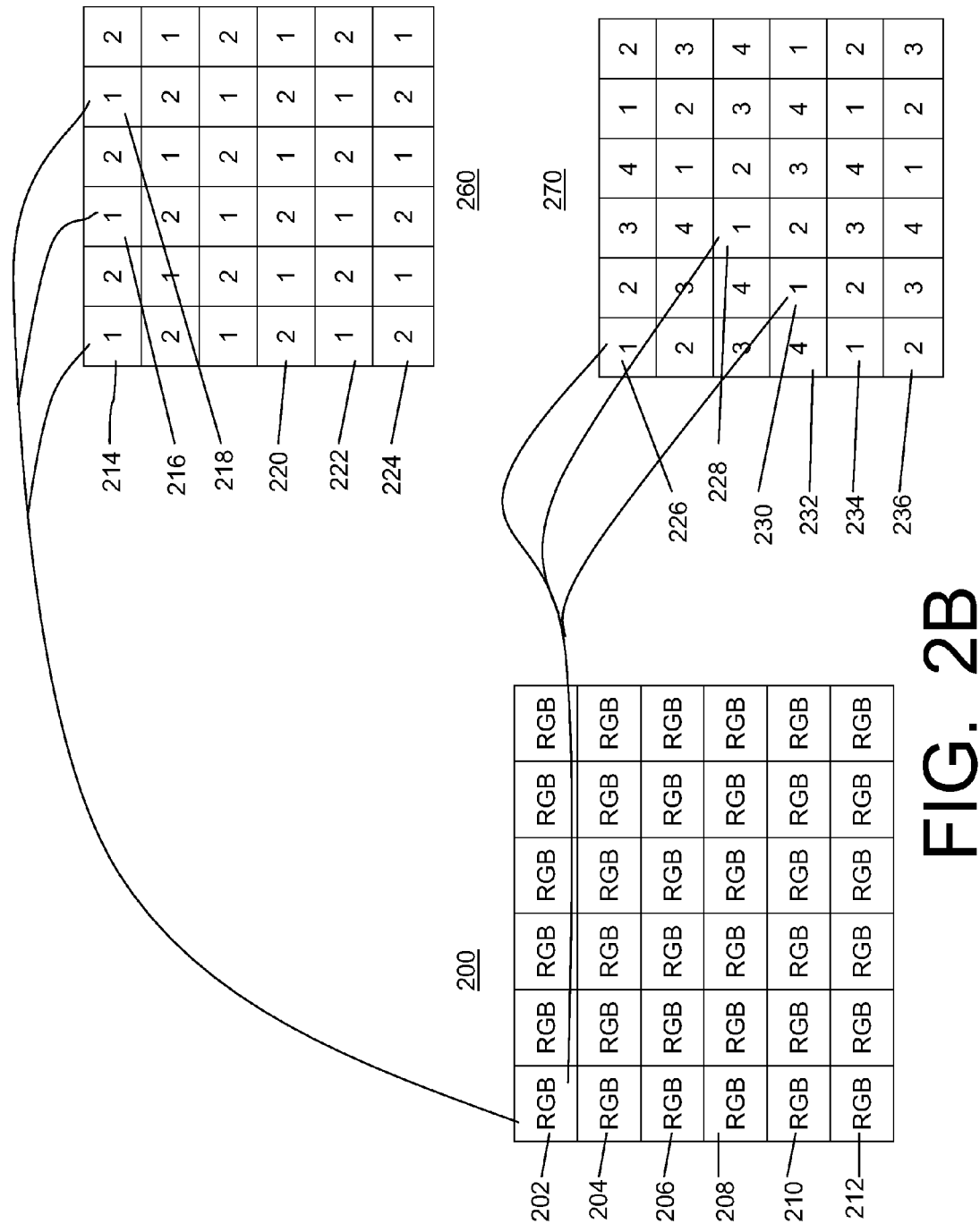
Figure 3:
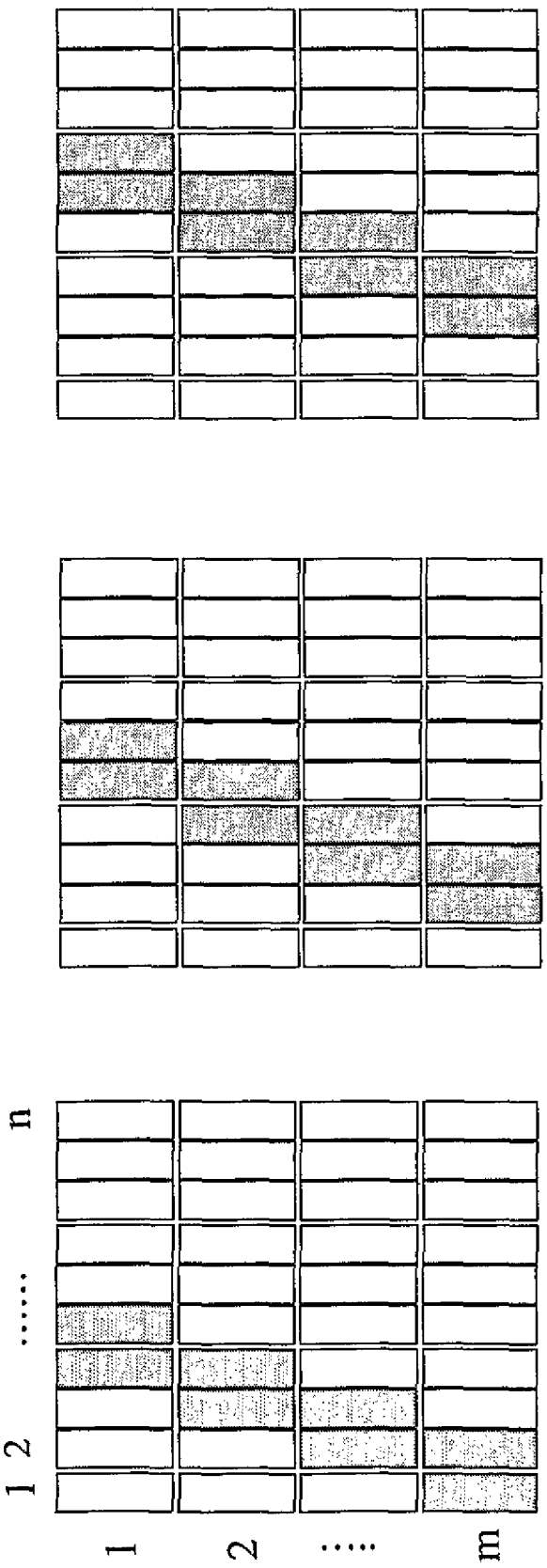
FIG. 3 shows an example of image data corresponding to three neighboring views.

FIG. 2B schematically shows further mappings of received image data 200 on a third structure 260 of data elements and a fourth structure 270 of data elements. The third structure 260 of data elements corresponds to views, indicated with the numbers 1-2. And the fourth structure 270 of data elements corresponds to four views, indicated with the numbers 1-4. It should be noted that alternative structures of data elements are possible.

The pixels as laid out on an N-view 3-D display device can be divided among repetitive unit cells or super-pixels, each of which comprises N sub-pixels. Each of these sub-pixels corresponds to one of the N different views and is arranged to produce one of the colors red, green, or blue. This layout is known and fixed for a particular 3-D display. As said, the lower part of FIG. 2A corresponds to a layout of data elements for nine views. The layout can be divided in unit cells each having nine sub-pixels. Each of these nine sub-pixels corresponds to one of the nine different views.

Typically, for neighboring views, there is a large correlation between the image content of the views. Besides that for views that are far apart, for example view 1 and view N, this correlation is less. Typically, the correlation between the image content of view 1 and view j is large for j=2 and gradually decreases when j increases to j=N. Suppose $R^2_{ij}$ is the inter-view correlation coefficient between view 1 and view j. Then typically this correlation coefficient decreases substantially linearly from j=1 to j=N for multi-view images. If the received image data, actually corresponding to a single-view is divided into structures of data elements on basis of the assumption that it relates to multiple views and the correlations between these structures is computed then the computed correlations are relatively low and/or are not decreasing substantially linearly. Besides that there is no pattern in the sequence of correlations observable which matches with a predetermined pattern. Notice that a sequence of gradually decreasing values is also a pattern.

As said, typically in the case of a multi-view image $R^2_{ij}$ versus j follows a substantially straight line, i.e. so-called linear regression. A measure of how well the linear regression model fits these inter-view correlation coefficients is called overall correlation coefficient, hereafter denoted by $R^2$. In the case that the received image data represents multiple views and the appropriate layout of data structures is evaluated, $R^2$ is substantially equal to one. However, if the received image data actually corresponds to a single view, the computed overall correlation coefficient is substantially equal to zero.

Next the method to compute the inter-view correlation coefficient $R^2_{ij}$ and the overall correlation coefficient $R^2$ will be explained in more detail.

The first step is dividing the received image data into a number of structures of data elements corresponding to the different views. Suppose that the assumed layout corresponds to the actual layout of a display device. Consider for example an N-view display device having m*n*N pixels, corresponding to 3*m*n*N sub-pixels. Each view of a certain color corresponds to m*n sub-pixels. As an example, in FIG. 3 the image content of three different views of a particular color are shown. The resemblance between the image content of view 1 and view 2 is relatively large. The resemblance is less for view 1 and view 3.

Subsequently, various inter-view correlation coefficients are computed. The inter-view correlation coefficient for two views i and j corresponding to the same color is computed on basis of Equation 1:

$$R_{ij}^2 = \frac{nm\sum X_{nm}^i X_{nm}^j - \sum X_{nm}^i \sum X_{nm}^j}{\sqrt{[nm\sum X_{nm}^{i2} - (\sum X_{nm}^i)^2]\cdot[nm\sum X_{nm}^{j2} - (\sum X_{nm}^j)^2]}} \quad (1)$$

here, $X_{nm}^i$ and $X_{nm}^j$ are the luminance values of two sub-pixels located at coordinates (n,m) in different views (views i and j) corresponding to the same color. The summation is with respect to all pixels (n,m).

The inter-view correlation coefficients obtained for each of the three colors may be averaged in order to arrive at an averaged inter-view correlation coefficient for respective views under consideration. Alternatively only the largest inter-view correlation coefficients of the three colors is considered, since it could be that there is less information present in some color components.

Finally, it is established that the received image data corresponds to multiple views if at least one of the inter-view correlation coefficients is higher than a predetermined threshold.

Alternatively the computed inter-view correlation coefficients are analyzed to determine whether they match with a predetermined pattern. FIG. 4A shows an example of inter-view correlation coefficients, $R^2_{ij}$, for a typical multi-view image for a nine-view display device. In other words, FIG. 4A shows a contour plot of the value of the inter-view correlation coefficient $R^2_{ij}$ as a function of the views i and j, for a typical multi-view image for a nine-view display device. Along the diagonal, at which i=j, the inter-view correlation coefficient is equal to one. Away from the diagonal, the inter-view correlation coefficient decreases monotonically. For example, considering the inter-view correlation coefficient between view 5 and view j, $R^2_{5j}$ increases from j=1 to j=5 and decrease again from j=5 to j=9.

To quantify the mutual relations between the inter-view correlation coefficients, the overall correlation coefficient $R^2$ is computed, as specified in Equation 2

$$R^2 = \frac{N\sum R_{1j}^2 j - \sum R_{1j}^2 \sum j}{\sqrt{[N\sum R_{1j}^{2^2} - (\sum R_{1j}^2)^2]\cdot[N\sum j^2 - (\sum j)^2]}} \quad (2)$$

The summation is with respect to j from j=1 to j=N. The computation results in a relatively high overall correlation coefficient if the assumption about layout of structures of data elements is valid.

Optionally, the received image data is divided on basis of an alternative layout of structures of data elements, followed by a similar evaluation as describe above.

Figure 4B:
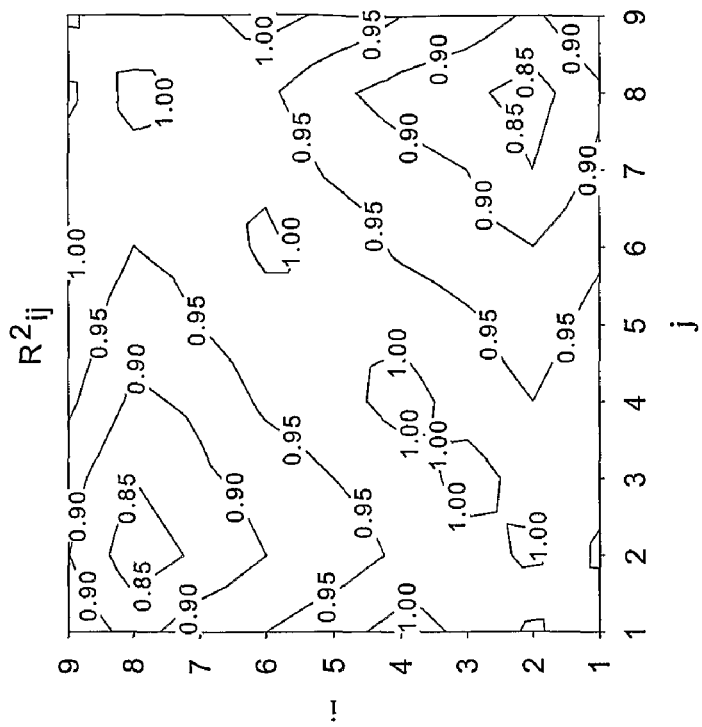
FIG. 4B shows another example of inter-view correlation coefficient, $R^2_{ij}$, for a typical 3-D image on another 9-view display device.
Figure 4A:
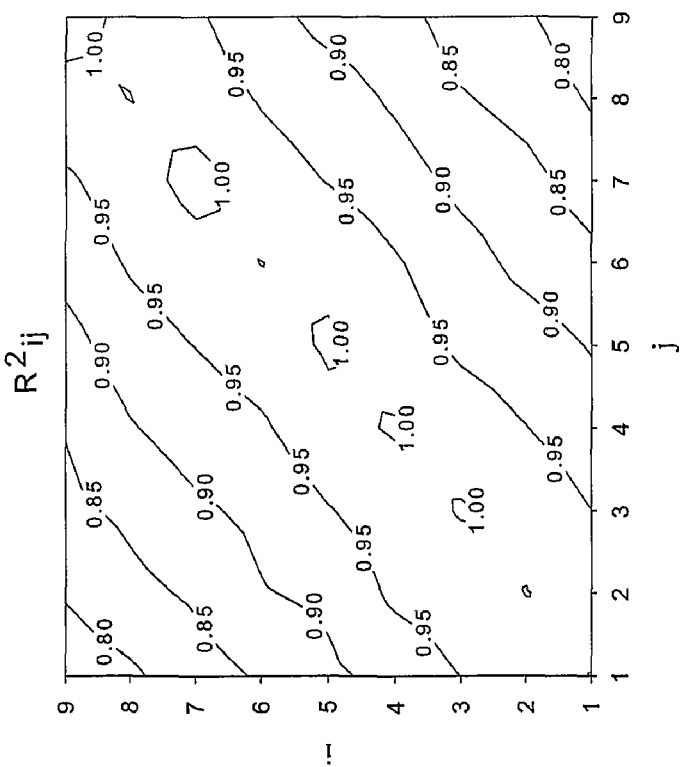
FIG. 4A shows an example of inter-view correlation coefficient, $R^2_{ij}$, for a typical 3-D image on a 9-view display device.

FIG. 4B shows another example of inter-view correlation coefficients, $R^2_{ij}$, for another multi-view image for a nine-view display device. Now the subsequent inter-view correlation coefficients are not increasing/decreasing, but correspond to a predetermined pattern. The views are disposed according to what is called a "periodic" distribution. That concept is disclosed in more detail in patent application with filing number EP 04101024.0 filed at Mar., 9, 2004

Figure 5:
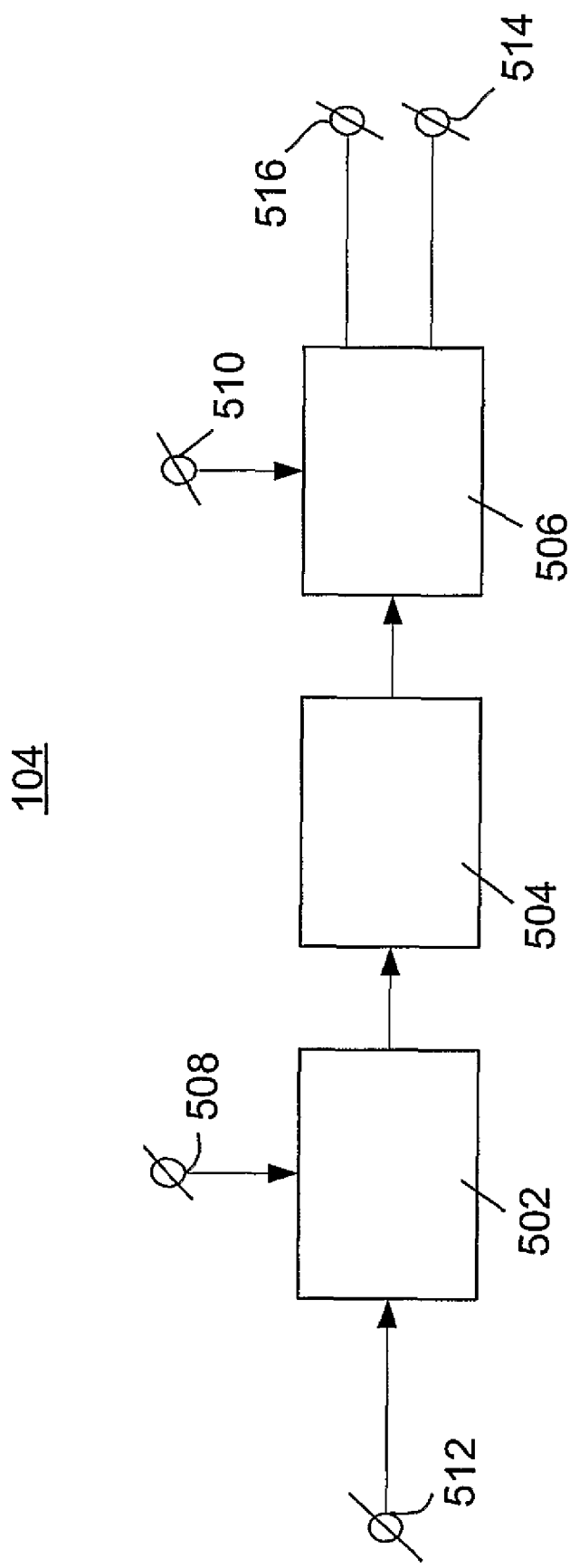
FIG. 5 schematically shows an embodiment of the view mode analyzing unit according to the invention.

FIG. 5 schematically shows an embodiment of the view mode analyzing unit 104 according to the invention. The view mode analyzing unit 104 is arranged to analyze received image data to determine whether the received image data corresponds to a single-view or to multiple views. The view mode analyzing unit 104 comprises:
  a dividing unit 502 for dividing the received image data into a number of structures of data elements;
  a computing unit 504 for computing a correlation between a first one of the structures of data elements and a second one of the structures of data elements; and
  an establishing unit 504 for establishing that the received image data corresponds to multiple views or not.

The dividing unit 502, the computing unit 504 and the establishing unit 504 may be implemented using one processor.

The view mode analyzing unit 104 is provided with image data at its input connector 512 and is arranged to provide a first output signal at its first output connector 514 and to provide a second output signal at its second output connector 516. The first output signal represents the actual layout of structures of data elements, i.e. how the different views of a multi-view configuration are disposed. That information is to be provided to an image rendering unit 112. Optionally, the first output signal comprises additional information, e.g. which of the views is the central view and whether the views are "periodic". The second output signal indicates whether the received image data corresponds to a single-view or multiple views. The second output signal is to be provided to an optical directing unit 110 which is arranged to switch between a single-view mode and a multi-view mode.

The dividing unit 502 comprises a first control interface 508 for providing the view mode analyzing unit 104 with a set of layouts of structures of data elements. The dividing unit is arranged to divide the received image data on basis of a selected one of the layouts.

The establishing unit 504 comprises a second control interface 510 for providing the view mode analyzing unit 104 with a predetermined pattern to be applied for analyzing the sequence of inter-view correlation coefficients.

Preferably, the view mode analyzing unit 104 according to the invention comprises temporal filtering means, i.e. a low pass filter. The analyzing is performed on subsequent images. It may happen that subsequent analysis on basis of subsequent images results in two different outcomes. For instance a number of subsequent analysis indicate that the received image data corresponds to multi-view and suddenly one isolated analysis indicates that the just received portion of the image data corresponds to a single view. Typically, the probability that the latest analysis is incorrect is higher than that the just received portion of the image data actually corresponds to the single view. To prevent that the view mode analyzing unit 104 provides instable outcome temporal filtering is preferably applied.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of analyzing received image data to determine whether the received image data corresponds to a single-view or to multiple views, the method comprising the steps of:
   dividing the received image data into a number of structures of data elements;
   computing a correlation between a first one of the structures of data elements and a second one of the structures of data elements; and
   establishing that the received image data corresponds to multiple views on basis of the correlation between the first one of the structures of data elements and the second one of the structures of data elements.

2. The method of analyzing as claimed in claim 1, wherein said method further comprises the step of:
   establishing that the received image data corresponds to multiple views if the correlation is higher than a predetermined threshold.

3. The method of analyzing as claimed in claim 1, wherein said method further comprises the step of:
   computing a further correlation between the first one of the structures of data elements and a third one of the structures of data elements and establishing that the received image data corresponds to multiple views if the further correlation is lower than the correlation between the first one of the structures of data elements and the second one of the structures of data elements.

4. The method of analyzing as claimed in claim 1, wherein said method further comprises the step of:
   computing a sequence of further correlations between the first of the structures of data elements and respective further structures of data elements and establishing that the received image data corresponds to multiple views if the consecutive correlations of the sequence of further correlations are mutually related according to a predetermined pattern.

5. The method of analyzing as claimed in claim 4, wherein the particular layout of structures of data elements corresponds to a particular layout of structure of light generating elements of a display device which is arranged to receive the image data and which is arranged to generate a particular number of views which matches with the particular layout of structures of data elements.

6. The method of analyzing as claimed in claim 1, wherein the step dividing the received image data into the number of structures of data elements is based on selecting a particular layout of structures of data elements from a set of layouts of structures of data elements.

7. A non-transitory computer-readable storage medium encoded with a computer program to be loaded by a computer arrangement, said computer program comprising instructions to analyze received image data in order to determine whether the received image data corresponds to a single-view or to multiple views, the computer arrangement comprising processing means and a memory, the computer program, after being loaded, causing said processing means to carry out the steps:
   dividing the received image data into a number of structures of data elements;
   computing a correlation between a first one of the structures of data elements and a second one of the structures of data elements; and
   establishing that the received image data corresponds to multiple views on basis of the correlation between the first one of the structures of data elements and the second one of the structures of data elements.

8. A view mode analyzing unit for analyzing received image data to determine whether the received image data corresponds to a single-view or to multiple views, the view mode analyzing unit comprising:
   dividing means for dividing the received image data into a number of structures of data elements;
   computing means for computing a correlation between a first one of the structures of data elements and a second one of the structures of data elements; and
   establishing means for establishing that the received image data corresponds to multiple views on basis of the correlation between the first one of the structures of data elements and the second one of the structures of data elements.

9. A display device which is arranged to display multiple views on basis of received image data, the display device comprising:
   receiving means for receiving image data;
   light generating means for generating light on basis of the received image data; and
   the view mode analyzing unit for analyzing the received image data to determine whether the received image data corresponds to a single-view or to multiple views, as claimed in claim 8.

10. The display device as claimed in claim 9 which is arranged to switch a portion of the display device between a first view mode and a second view mode, comprising optical means for transferring the generated light in dependence of an actual view mode of the portion of the display device, the actual view mode being either the first view mode or the second view mode, the optical means being controlled by the view mode analyzing unit.

11. The display device as claimed in claim 9, wherein said display device further comprises:
   mapping means for mapping a first number of views into a second number of views, being different from the first number of views.

* * * * *